Dec. 26, 1972   P. T. CHIANG   3,707,357
WET-PROCESS PHOSPHORIC ACID EXTRACTION INCLUDING SEPARATING
SOLVENT FROM THE EXTRACT BY FREEZING SOLVENT
Filed March 23, 1971

INVENTOR
PETER T. CHIANG

By Serle Messiff
Attorney

United States Patent Office 3,707,357
Patented Dec. 26, 1972

3,707,357
WET-PROCESS PHOSPHORIC ACID EXTRACTION INCLUDING SEPARATING SOLVENT FROM EXTRACT BY FREEZING SOLVENT
Peter T. Chiang, Atlanta, Ga., assignor to United States Steel Corporation
Filed Mar. 23, 1971, Ser. No. 127,269
Int. Cl. B01d 9/04, 11/04; G01b 25/22
U.S. Cl. 23—312 P
10 Claims

ABSTRACT OF THE DISCLOSURE

Phosphoric acid is selectively extracted from impure wet-process phosphoric acid and then stripped from the solvent extract by crystallization of the solvent with or without the addition of water.

BACKGROUND OF THE INVENTION

Figure 1:
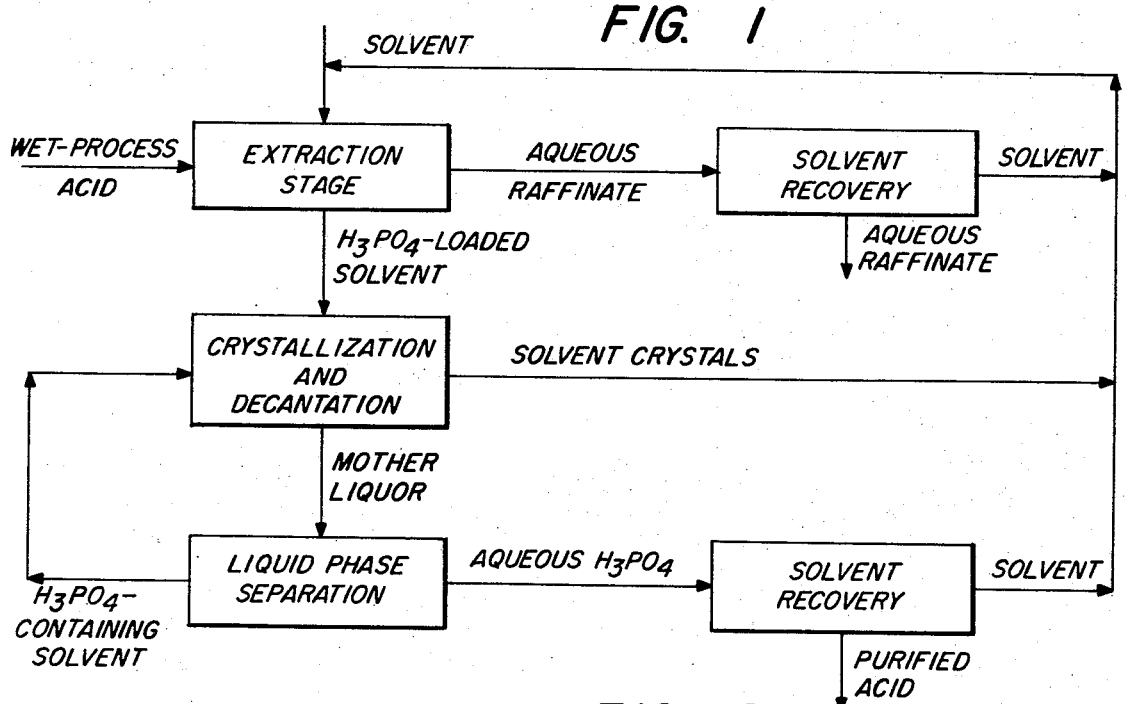

It is well known that phosphoric acid produced by the conventional wet-process method requires some degree of purification when intended for use in food chemicals, detergent manufacture, and liquid fertilizers. In general, iron, aluminum, calcium, magnesium, arsenic, chromium, silicon, sulfate, and fluoride ions are the impurities which require removal from the wet-process phosphoric acid prior to its intended use.

A number of solvent extraction methods for the purification of wet-process phosphoric acid have been published in the literature. Many of them follow a procedure of extracting phosphoric acid from the wet-process acid with a solvent, separating the aqueous raffinate from the solvent extract, and stripping the solvent extract with water to release the acid.

The main drawback of using water as a stripping reagent is the dilution of the purified acid. The ideal approach in this case is partial or complete removal of the solvent from the solvent extract so that a much more concentrated purified acid can be released. Two methods along this line are described in U.S. Pat. 2,880,063, Mar. 31, 1959. They are the following:

(a) The solvent extract is mixed with a second solvent which is miscible with the first solvent but is not a solvent for aqueous phosphoric acid. By this operation, a new two-phase system is created in which the bottom phase consists of a concentrated aqueous acid while the top phase is a mixture of the two solvents. The solvent mixture may be subjected to fractional distillation and the two solvents can be separately recycled.

(b) The solvent is directly subjected to distillation, whereby concentrated aqueous phosphoric acid is obtained as a residue.

The first method described above involves an additional extraction step as well as a fractional distillation step, whereas the second method may cause serious decomposition of the solvent.

SUMMARY OF THE INVENTION

Accordingly, the process of my invention utilizes a completely different method of removing the solvent from the solvent extract; namely, by crystallization. My process requires a special class of solvents which not only extract phosphoric acid from wet-process acid but which also can be crystallized from the solvent extract at moderately low temperatures.

I have found that solvents fulfilling these requirements are the low-melting solids, i.e., glycols, monohydroxyl alcohols, ethers, ketones, esters and sulfoxides which are insoluble or at most only slightly soluble in aqueous phosphoric acid.

My process consists of extracting phosphoric acid from the wet-process acid to the solvent phase at a temperature slightly above the melting point of the solvent. The solvent extract is separated from the aqueous raffinate phase at this temperature and cooled to ambient temperature or below. On cooling, partial crystallization of the solvent occurs, which allows it to be easily separated from the mother liquor. Purified aqueous phosphoric acid is then recovered from the mother liquor with or without the addition of water. In the latter case, the purified phosphoric acid strength is almost as high as the feed acid.

Using my novel procedure, I have consistently been able to obtain impurity rejections of over 80% in regard to iron, aluminum, magnesium and fluorine when the mother liquor from the crystallization step consists of two phases and impurity rejections of up to 50% and more when the mother liquor from the crystallization step consists of only one phase. By varying the ratio of solvent to feed acid and the concentration of the feed acid, it is possible to obtain purified acid in yields of from 20% to 80% of the phosphate values fed.

DETAILED DESCRIPTION

Solvents suitable for use in this process are those organic solvents which are capable of preferentially extracting phosphoric acid from impure aqueous solutions. Generally, the organic solvents should have melting points of from about 0° C. to about 100° C., preferably from about 20° C. to about 80° C. Solvents having melting points above about 100° C. generally lack thermal stability in phosphoric acid and are thus not suitable. The solvents suitable for use in this process crystallize readily from a phosphoric acid medium at temperatures of from about $-25°$ C. to about 25° C., preferably from about 0° C. to about 25° C. To facilitate phase separation of the loaded solvent phase and the raffinate phase and to minimize solvent losses, it is necessary to use only those solvents which are insoluble or at most 10% soluble in aqueous phosphoric acid.

Table I lists suitable solvents. It is not meant to be limiting. Other organic solvents for phosphoric acid, melting in the range of about 0–100° C., and insoluble or at most 10% soluble in aqueous phosphoric acid, may also be used. The low melting point solid glycols listed are preferred. Especially suitable glycols are 2,2,4-trimethyl-1,3-pentanediol and 2,2-diethyl-1,3-propanediol.

TABLE I

Solvent

Glycols:
    2,2-diethyl-1,3-propanediol
    2-ethyl-2-butyl-1,3-propanediol
    2,3-dimethyl-1,3-butanediol
    2,2,4-trimethyl-1,3-pentanediol
    3,4-diethyl-3,4-hexanediol
    1,8-octanediol
    1,9-nonanediol
    1,10-decanediol
Monohydroxyl alcohols (primary):
    7-chloro-1-heptanol
    1-octanol
    9-chloro-1-nonanol
    10-fluoro-1-decanol
    1-dodecanol
Ethers:
    Ethyl octyl ether
    Dihexadecyl ether
Ketones:
    Methyl n-octyl ketone
    Methyl n-decyl ketone
    2,7-octanedione

TABLE I—Continued

Esters:
- triphenyl phosphate
- dimethyl hexanedioic acid
- monoethyl heptanedioic acid
- dimethyl decanedioic acid Sulfoxides:
- dipropyl sulfoxide
- dibutyl sulfoxide The extractive efficiency of the solvent increases with the concentration of the feed phosphoric acid. The concentration of the feed acid should be between from about 30 weight percent $H_3PO_4$ to about 80 weight percent $H_3PO_4$, preferably from about 40 weight percent $H_3PO_4$ to about 70 weight percent $H_3PO_4$. From about 5 to about 0.2 parts of solvent per part of feed acid may be used. I prefer to use from about 2 to about 0.5 part.

The extraction operation may be carried out in any of several suitable devices such as mixer-settlers, agitated columns or liquid-liquid centrifugal contactors. Either batch or continuous methods may be used.

The feed acid and the solvent are fed into the extraction apparatus and contacted for a length of time sufficient to completely load the solvent with acid. Generally, a period of from about 10 minutes to about 60 minutes is sufficient to completely load the solvent. The temperature should be at least about 5° C. above and preferably in the range of from about 5° C. to about 20° C. above the melting point of the solvent, most preferably in the range of from about 10° C. to about 15° C. above the solvent melting point.

When the mixture has settled into two liquid phases, the phosphoric acid laden solvent phase is separated from the aqueous phase and cooled to a temperature below its melting point. Generally, the solvent phase will contain at least about 20 weight percent of the $H_3PO_4$ fed to the system. The solvent phase is maintained at a temperature below its melting point for a period of time sufficient for crystallization of at least 50% of the solvent. The time required for this operation is in the range of from about 2 hours to about 8 hours depending on the temperature and the solvent used. Preferably the temperature is maintained at least 20° C. below the melting point of the solvent. The mother liquor is separated from the solvent crystals by conventional means such as decantation or filtration. The crystallized solvent is heated and recycled to the extraction step. The mother liquor will be found to consist of either one or two (one aqueous and one organic) phases, depending on the degree of crystallization. In the latter case, purified aqueous phosphoric acid, having a concentration approximately that of the feed acid, is directly separated by conventional means from the $H_3PO_4$ containing solvent phase, and the $H_3PO_4$ containing solvent phase is recycled to the crystallization step. Where the mother liquor from the crystallization step consists of only one phase, a small amount of water is added to strip the phosphoric acid from the $H_3PO_4$-loaded solvent phase, the aqueous phase is separated and the partially stripped solvent phase is recycled to the crytsallization step.

Sufficient solvent dissolves in both the purified phosphoric acid and the aqueous raffinate to warrant a solvent recovery operation using conventional separation means, such as extraction into a second solvent or distillation.

The following examples illustrate my invention, but are not intended to be limiting.

EXAMPLE I

This example is representative of the process presented in FIG. 1. 350 g. wet-process phosphoric acid containing 56.3% $H_3PO_4$ by weight (197 g.) was stirred with 350 g. of recycled 2,2,4-trimethyl-1,3-pentanediol (TMPD) containing 3.1% (11 g.) $H_3PO_4$ and 0.5% $H_2O$ at 50° C. for 1 hour. The mixture was allowed to settled at 50° C. for 2 hours into two liquid phases and separated. The aqueous bottom phase weighed 237 g. and contained 53.6% (127 g.) $H_3PO_4$ and 1.1% TMPD, as well as most of the impurities of the original wet acid. The TMPD phase weighed 463 g. and contained 17.5% (81 g.) $H_3PO_4$ which corresponded to 39% of the original $H_3PO_4$ subjected to extraction. The $H_3PO_4$-loaded TMPD extract was cooled and stored overnight at ambient temperature to allow the crystallization of the TMPD. The unwashed TMPD crystals, separated from the mother liquor by decantation, weighing 347 g. and containing 8.4% (29 g.) $H_3PO_4$, were ready for recycle to the extraction step. The mother liquor, 116 g., consisted of one aqueous phase and one $H_3PO_4$-containing TMPD phase. The latter, separated from the former, weighing 64 g. and containing 37.5% (24 g.) $H_3PO_4$, was ready for recycle to the crystallization step. The aqueous phase (purified acid), amounting to 52 g., contained 53.8% (28 g.) $H_3PO_4$ and 6.7% TMPD before it was subjected to a TMPD recovery operation.

EXAMPLE II

Figure 2:
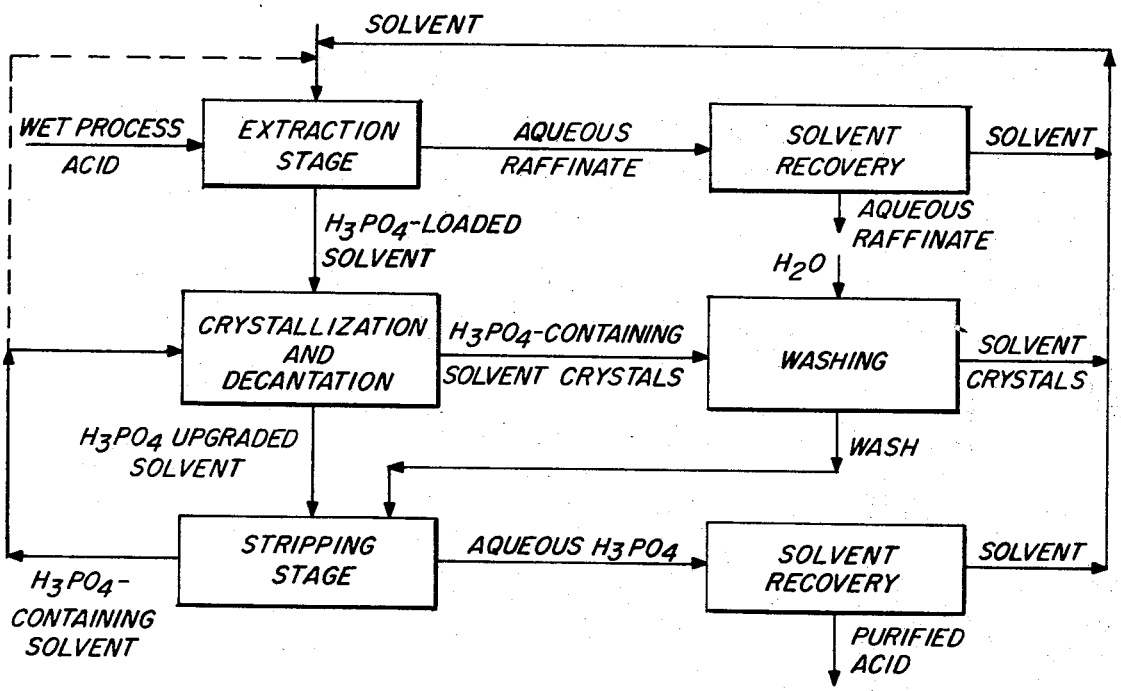

This example is representative of the process presented in FIG. 2.

300 g. wet-process phosphoric acid containing 66.3% $H_3PO_4$ by weight (199 g.) was stirred with 450 g. pure TMPD at 50° C. for 1 hour. The mixture was allowed to settle at 50° C. for 2 hours into two liquid phases and separated. The aqueous bottom phase, 82 g., contained 58.5% (48 g.) $H_3PO_4$ and 1.0% TMPD, as well as most of the impurities of the original wet acid. The TMPD extract weighed 668 g. and contained 22.6% (151 g.) $H_3PO_4$, which corresponds to 76% of the original $H_3PO_4$ subjected to extraction. The $H_3PO_4$-loaded TMPD extract was cooled and stored overnight at ambient temperature to allow the crystallization of the TMPD. The TMPD crystals, separated from the mother liquor by decantation, were washed with 153 g. water. The washed crystals, weighing 387 g. and containing 2.6% (10 g.) $H_3PO_4$, were ready for recycle to the extraction step. The wash weighed 205 g. and contained 36 g. $H_3PO_4$. The mother liquor from the decantation, 229 g., consisted of a single $H_3PO_4$-loaded TMPD phase and contained 105 g. $H_3PO_4$. Therefore, the $H_3PO_4$ concentration was upgraded from 22.6% in the TMPD etxract to 45.9% in the mother liquor through the crytsallization step. The mother liquor was then stirred with the wash for 1 hour and the mixture allowed to settle for 2 hours at ambient temperature. Subsequently, the aqueous phosphoric acid (purified acid) was separated from the partially stripped TMPD phase. The former, amounting to 343 g., contained 40.2% (138 g.) $H_3PO_4$ and 1.7% TMPD before it was subjected to a TMPD recovery operation. The latter, weighing 91 g. and containing 3.3% (3 g.) $H_3PO_4$, was ready for recycle to the extraction step.

EXAMPLE III

This example is representative of the process described in FIG. 2, excluding the washing step.

281 g. wet-process phosphoric acid containing 49.2% $H_3PO_4$ by weight (138 g.) was stirred with 281 g. 2,2-diethyl-1,3-propanediol (DEPD) at 60° C. for 1 hour. The mixture was allowed to settle at 60° C. for 2 hours into two liquid phases and separated. The aqueous bottom phase, 110 g., contained 49.6% (54.5 g.) $H_3PO_4$ and 2.6% DEPD, as well as most of the impurities of the original wet acid. The DEPD extract weighed 452 g. and contained 18.5% (83.5 g.) $H_3PO_4$, which corresponds to 60% of the original $H_3PO_4$ subjected to extraction. The $H_3PO_4$-loaded DEPD extract was cooled and stored overnight at 0° C. to allow crystallization of the DEPD. The unwashed DEPD crystals, separated from the mother liquor by decantation, weighing 234 g. and containing 4.1% (9.6 g.) $H_3PO_4$, were ready for recycle to the extraction step. The mother liquor, 218 g., consisted of a single $H_3PO_4$-loaded DEPD phase and contained 73.9 g. $H_3PO_4$. Consequently, the $H_3PO_4$ concentration was upgraded from 18.5% in the DEPD extract to 33.9% in the mother liquor through the crystallization step. The mother liquor was then stirred with 12 g. water for 15 minutes and the mixture allowed to settle for 1 hour at ambient temperature. Subsequently, the aqueous phosphoric acid (purified acid) was separated from the partially stripped BEPD phase. The former, 94 g., contained 39.0% (36.7 g.) $H_3PO_4$ and 9.4% DEPD before it was subjected to a DEPD recovery operation. The latter, weighing 136 g. and containing 27.3% (37.2 g.) $H_3PO_4$, was ready for recycle to the crystallization step.

The amount of solvent dissolved in the aqueous fractions in Examples I, II, and III was determined by extracting the aqueous fraction with benzene and subsequently evaporating the benzene. This practice may undoubtedly be used for solvent recovery in a commercial scale. Chemical analyses of the wet-process phosphoric acid, aqueous raffinate, and purified acid obtained from Examples I, II, and III are given in Table II. Analyses of the aqueous raffinate and purified acid were made after the solvent recovery step.

TABLE II.—CHEMICAL ANALYSES

| | Analysis, percent | | | | | |
|---|---|---|---|---|---|---|
| | $P_2O_5$ | $Fe_2O_3$ | $Al_2O_3$ | MgO | F | $SO_4$ |
| Example I: | | | | | | |
| Feed acid | 40.8 | 1.14 | 1.70 | 0.34 | 2.19 | 2.01 |
| Aqueous raffinate | 39.2 | 1.43 | 2.44 | 0.52 | 2.76 | 2.64 |
| Purified acid | 41.7 | 0.23 | 0.9 | 0.025 | 0.71 | 2.13 |
| Impurity rejection [1] | | 85 | 90 | 94 | 83 | Nil |
| Example II: | | | | | | |
| Feed acid | 48.0 | 0.93 | 1.03 | 0.235 | 0.66 | 2.65 |
| Aqueous raffinate | 42.8 | 3.32 | 3.70 | 0.85 | 1.71 | 3.51 |
| Purified acid | 29.6 | 0.27 | 0.15 | 0.032 | 0.20 | 1.17 |
| Impurity rejection [1] | | 52 | 76 | 78 | 51 | 28 |
| Example III: | | | | | | |
| Feed acid | 35.6 | 0.92 | 1.68 | 0.142 | 2.94 | 1.70 |
| Aqueous raffinate | 36.9 | 1.40 | 3.19 | 0.37 | 5.31 | 1.81 |
| Purified acid | 31.2 | 0.60 | 0.70 | 0.058 | 1.00 | 1.44 |
| Impurity rejection [1] | | 26 | 53 | 54 | 61 | 8 |

[1] See the following equation:
$$\frac{\text{Impurity}/P_2O_5 \text{ ratio in feed acid} - \text{impurity}/P_2O_5 \text{ ratio in purified acid}}{\text{Impurity}/P_2O_5 \text{ ratio in feed acid}} \times 100 = \text{percent impurity rejection}$$

I claim:
1. A process for the preparation of purified wet-process phosphoric acid comprising:
  (a) contacting impure wet-process phosphoric acid having a $H_3PO_4$ content in the range of from about 30 to about 80 weight percent with an organic solvent selected from the group consisting of 2,2-diethyl-1,3-propanediol, 2-ethyl-2-butyl-1,3-propanediol, 2,3-dimethyl-1,3-butanediol, 2,2,4-trimethyl-1,3-pentanediol, 3,4-diethyl-3,4-hexanediol, 1,8-octanediol, 1,9-nonanediol, 1,10-decanediol, 7-chloro-1-heptanol, 1-octanol, 9-chloro-1-nonanol, 10-fluoro-1-decanol, 1-dodecanol, ethyloctyl ether, dihexadecyl ether, methyl-n-octyl ketone, methyl-n-decyl ketone, 2,7-octanedione, triphenyl phosphate, dimethylhexandioic acid, monoethylheptanedioic acid, dimethyldecanedioic acid, dipropylsulfoxide, dibutylsulfoxide and mixtures thereof, at a temperature at least 5° C. above the melting point of said organic solvent for a period of time sufficient to form two liquid phases and to transfer at least 20% of the acid feed to the system into the solvent phase, said organic solvent melting in the range of from about 0 to about 100° C., and being at most 10% soluble in water;
  (b) separating the resulting two liquid phases;
  (c) cooling the solvent phase to a temperature below the melting point of the solvent;
  (d) maintaining the solvent phase at a temperature below the melting point of the solvent for a period of time sufficient to crystallize at least 50% of the solvent;
  (e) separating the crystallized solvent from the liquid; and
  (g) recovering purified phosphoric acid from the liquid.
2. The process of claim 1 wherein the portion of the mother liquor remaining after recovery of the purified phosphoric acid is recycled to step (c) and solubilized solvent from the aqueous phase of step (b) and from the purified phosphoric acid is recycled to step (a).
3. The process of claim 1 wherein the solvent is a glycol selected from 2,2-diethyl-1,3-propanediol, 2-ethyl-2-butyl-1,3-propanediol, 2,3-dimethyl-1,3-butanediol, 2,2,4-trimethyl-1,3-pentanediol, 1,9-nonanediol, 1,10-decanediol and mixtures thereof.
4. The process of claim 1 wherein the glycol is selected from 2,2,4-trimethyl-1,3-pentanediol and 2,2-diethyl-1,3-propanediol.
5. The process of claim 1 wherein the wet-process phosphoric acid has an $H_3PO_4$ content in the range of from about 40 to about 70 weight percent and the solvent has a melting point of from about 20° C. to about 80° C.
6. The process of claim 1 wherein purified phosphoric acid is recovered from the mother liquor by decanting the aqueous purified phosphoric acid containing phase.
7. The process of claim 1 wherein purified phosphoric acid is recovered from the mother liquor by stripping with a small amount of water and decanting the aqueous purified phosphoric acid containing phase.
8. The process of claim 1 wherein the feed acid and the solvent are contacted for a period of from about 10 to about 60 minutes.
9. The process of claim 1 wherein the solvent phase is cooled to a temperature at least 20° C. below the melting point of the solvent.
10. The process of claim 1 wherein the crystallized solvent from step (d) is melted and recycled to the extraction step (a).

References Cited
UNITED STATES PATENTS

| | | | |
|---|---|---|---|
| 1,451,786 | 4/1923 | Ross et al. | 23—165 B |
| 3,298,782 | 1/1967 | Archambault | 23—312 P |
| 3,497,329 | 2/1970 | Amanrich | 23—312 P |
| 3,556,739 | 1/1971 | Baniel | 23—312 P |
| 3,628,344 | 12/1971 | King | 62—58 |

FOREIGN PATENTS

| | | | |
|---|---|---|---|
| 698,732 | 11/1964 | Canada | 23—312 P |
| 11,105 | 4/1963 | Japan | 23—165 C |
| 1,427,531 | 12/1965 | France | 23—165 C |

WILBUR L. BASCOMB, JR., Primary Examiner

S. J. EMERY, Assistant Examiner

U.S. Cl. X.R.

23—299, 306, 312 P, 165 B C; 62—58